United States Patent
Garmon et al.

(10) Patent No.: US 10,277,086 B2
(45) Date of Patent: Apr. 30, 2019

(54) THERMO PUMP-COOLED GENERATOR END WINDINGS WITH INTERNAL COOLING PASSAGES

(71) Applicant: Siemens Energy, Inc., Orlando, FL (US)

(72) Inventors: Michael D. Garmon, Orlando, FL (US); Raul Ricardo Rico, Oviedo, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 441 days.

(21) Appl. No.: 14/554,489

(22) Filed: Nov. 26, 2014

(65) Prior Publication Data
US 2016/0149452 A1    May 26, 2016

(51) Int. Cl.
*H02K 1/32*    (2006.01)
*H02K 3/24*    (2006.01)

(52) U.S. Cl.
CPC .............. *H02K 3/24* (2013.01); *H02K 1/32* (2013.01)

(58) Field of Classification Search
CPC .. H02K 1/32; H02K 3/22; H02K 3/24; H02K 9/02; H02K 9/08; H02K 9/10; H02K 9/12; H02K 9/14; H02K 9/18; H02K 9/00; H02K 9/005; H02K 9/04; H02K 9/06; H02K 9/16
See application file for complete search history.

(56) References Cited

U.S. PATENT DOCUMENTS

| | | | |
|---|---|---|---|
| 1,487,221 A | 3/1924 | Ehrmann | |
| 2,755,395 A * | 7/1956 | Kilner | H02K 3/24 310/179 |
| 3,660,702 A | 5/1972 | Kishino | |
| 4,543,503 A * | 9/1985 | Kaminski | H02K 3/24 310/270 |
| 5,252,880 A * | 10/1993 | Kazmierczak | H02K 3/24 310/201 |
| 6,087,745 A | 7/2000 | Dreher | |
| 6,204,580 B1 | 3/2001 | Kazmierczak | |
| 6,252,318 B1 * | 6/2001 | Kazmierczak | H02K 3/24 310/260 |
| 6,628,020 B1 * | 9/2003 | Tong | H02K 1/32 310/58 |
| 6,774,515 B2 | 8/2004 | Mori et al. | |
| 6,781,261 B2 | 8/2004 | Klaar | |
| 7,190,094 B2 | 3/2007 | Mayor | |
| 7,638,909 B2 | 12/2009 | Hattori et al. | |
| 7,791,230 B2 | 9/2010 | Kaminski et al. | |
| 7,893,576 B2 | 2/2011 | Salamah et al. | |
| 8,040,002 B2 | 10/2011 | Tartaglione | |

(Continued)

FOREIGN PATENT DOCUMENTS

EP    1171937 A1    1/2002
WO    2007094018 A1    8/2007

*Primary Examiner* — Quyen P Leung
*Assistant Examiner* — Eric Johnson

(57) ABSTRACT

Rotor windings for a thermo pump-cooled generator have an internally formed cooling passage having a cooling inlet on a radial underside of the motor end winding portion and a cooling outlet on a radial upper side of the axial portion that is oriented within the generator air gap. The cooling passage in the rotor winding exhausts air from end winding portions that are circumscribed by a generator retaining ring into the generator air gap.

4 Claims, 5 Drawing Sheets

(56) References Cited

U.S. PATENT DOCUMENTS

| | | |
|---|---|---|
| 8,049,379 B2 | 11/2011 | Buskirk et al. |
| 8,076,805 B2 | 12/2011 | Kabata et al. |
| 8,614,528 B2 | 12/2013 | Eichinger et al. |
| 2002/0185923 A1 | 12/2002 | Mori |
| 2003/0029624 A1 | 2/2003 | Klaar |
| 2004/0084976 A1 | 5/2004 | Thiot |
| 2004/0201293 A1 | 10/2004 | Mayor |
| 2006/0028074 A1* | 2/2006 | Komura ............ H02K 3/24 310/61 |
| 2007/0085428 A1* | 4/2007 | Hattori ............ H02K 3/24 310/58 |
| 2007/0222333 A1 | 9/2007 | Hattori et al. |
| 2010/0045126 A1* | 2/2010 | Hattori ............ H02K 3/24 310/59 |

* cited by examiner

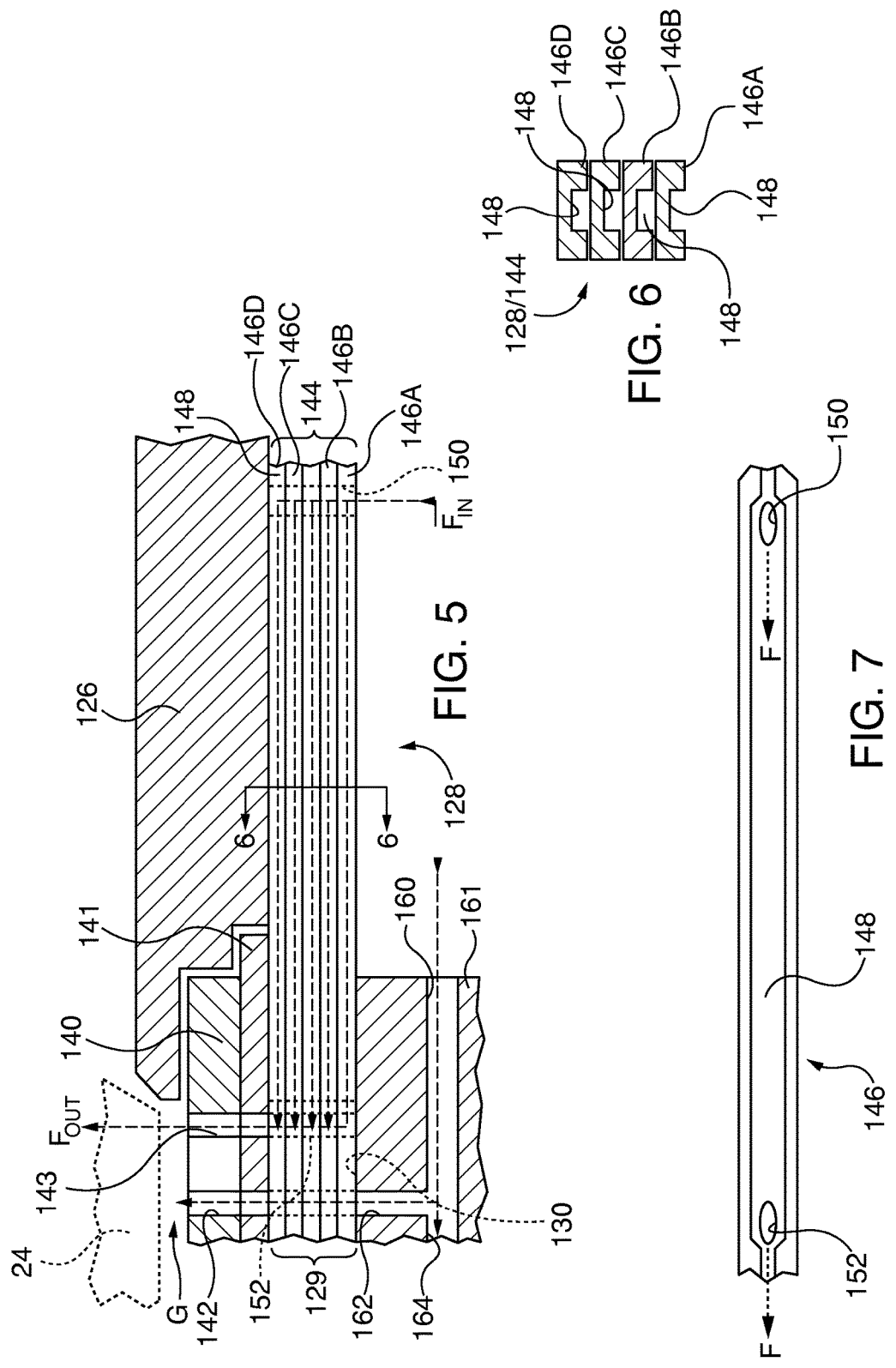

THERMO PUMP-COOLED GENERATOR END WINDINGS WITH INTERNAL COOLING PASSAGES

BACKGROUND OF THE INVENTION

1. Field of the Invention

The invention relates to thermo pump-cooled generators that exhaust heated air from the rotor end windings, which are constrained within a generator retaining ring, into the rotor/stator annular air gap. More particularly the invention relates to rotor windings for thermo pump-cooled generators that have an internally formed cooling passage, with a cooling inlet on a radial underside of the rotor end winding portion and a cooling outlet on a radial upper side of the winding axial portion that is oriented within the generator air gap.

2. Description of the Prior Art

Known generators have a generator rotor with rotor windings, including axial portions that are positioned within generator rotor channels and end portions with turn bends. Electrical generator retaining rings at each axial end of the rotor circumscribe and support the rotor winding end turns against centrifugal force generated by rotor cyclic rotation. As the generator is operated, heated air accumulates within the end winding portions that are circumscribed by the retaining ring. Many known generator end winding cooling systems exhaust the heated air that would otherwise be confined within the retaining ring by either a forced axial flow path through the rotor body or a by a thermo pumping convective/centrifugal radial flow through channels formed in the rotor body teeth between successive rotor winding retaining channels.

In forced flow cooling systems cooling flow is generated by a pressure differential developed across the inlet and outlet of a cooling duct which forces air over the rotor end windings in a flow path that is generally axially oriented, parallel to the rotor shaft. Air channels are formed in the rotor body to exhaust air from within the retaining ring zone, which includes the rotor end winding portions, in an axially inboard direction to the rotor body. Once inboard the retaining ring, exhausted airflow is typically radially directed to the stator/rotor air gap by radially oriented portions of the rotor body air channels. Exemplary forced flow cooling systems are shown in U.S. Pat. Nos. 6,087,745 and 6,781,261.

Exemplary thermo pumping generator end winding cooling systems are shown in FIGS. 1 and 2 herein. It is believed that thermo pump-cooled systems offer advantages over forced flow cooling systems. Thermo pump-cooled systems do not require an externally applied pressure differential or auxiliary plenums and inlet guide baffles needed to route the cooling air to the end windings or to exhaust cooling air downstream of the end windings into channels formed in the rotor body. In thermo pump-cooled systems elongated serpentine ventilation paths do not have to be machined into the rotor body or end winding inter-coil insulation.

In thermo pump-cooled generator cooling systems relatively denser and cooler air in the retaining ring constrained region of the end windings is flung radially outwardly toward the end winding portions that are proximal the retaining ring. More specifically, FIGS. 1 and 2 show a known thermo pump-cooled generator 20, having a generator rotor 22, mounted on a rotor shaft 23. The rotor is circumscribed within a bore of stator 24, separated from each other by an annular air gap G. Electrical generator retaining rings 26 are coupled to the rotor 22 at each of the latter's axial ends. Rotor windings 28 have axial portions 29 that are respectively oriented within respective rotor winding channels 30, circumscribed by the stator 24 bore and the air gap G. The rotor winding channels are circumferentially separated by rotor teeth 32, into which are machined radial vent channels 34 and axial vent channels 36. The rotor teeth vent channels 34 and 36 are in communication with each other, so that heated air enters the axial vent channel 36 and is exhausted out of the radial vent channels 34 into the annular air gap G. Similarly other rotor air cooling axial vents (not shown) are formed in the rotor 22 radially inwardly below the rotor winding axial portion 29, which in turn vent radially into the annular gap G through vent holes 42 formed within wedge 40.

The rotor windings 28 also have end winding portions 44, including end turn bend portions, that extend outboard the annular air gap G. The end winding portions are circumscribed by the retaining ring 26. The retaining ring 26 supports the rotor winding end portions 44 end turns against centrifugal force generated by rotating rotor 22.

SUMMARY OF THE INVENTION

In accordance with exemplary embodiments of the invention, rotor windings for a thermo pump-cooled generator have an internally formed cooling passage. The cooling passage has cooling inlet on a radial underside of the rotor end winding portion and a cooling outlet on a radial upper side of the axial portion that is oriented within the generator air gap. The cooling passage in the rotor winding exhausts air from end winding portions that are circumscribed by a generator retaining ring into the generator air gap. Exemplary thermo pump-cooled generators described herein exhaust air from within the rotor end winding portions that are constrained within the retaining ring through cooling passages or channels formed within the windings that pass under the retaining ring, rather than solely relying on through machined passages formed in rotor teeth. In some embodiments described herein, heated gas to be exhausted enters the winding through one or more radial channels formed in a winding stack of a rotor end winding portion, then travels axially under the retaining ring/rotor body interface through channels formed in the winding (such as through channels formed in the bottom or one or more of the laminations that comprise the aggregate the stacked winding), then exits into the air gap through a radial channel formed in the axial portion of the winding that is oriented inboard of the retaining ring. In some embodiments, the exhausted air passes through a mating aperture in a slot top filler and ventilation wedge. Optionally, the remaining length of the winding axial portion is cooled by a known radial path design. Existing design winding stack individual laminations may already have full or partial C-shape cross sections, which may be modified to form axial portions of the cooling passage that is utilized in exemplary embodiments of the invention.

Incorporating a cooling passage within the generator winding under the retaining ring is a more cost effective alternative or supplement to known cooling passages formed in rotor teeth. Machining cooling passages in rotor teeth is relatively expensive and requires tight tolerances. A mismatched or poorly machined cooling passage in a rotor tooth may require scrapping of an expensive and large rotor forging. Depending on the specific generator application, machining cooling passages in the rotor tooth negatively impacts overall rotor structural strength and/or occupies volumetric space in the rotor forging that can otherwise be utilized for larger rotor shaft diameter or more capacity to increase winding volume. Additionally in some applications, e.g., in a hydrogen environment where rotor operational lifespan is typically limited by a statistically calculated number of operational cycles before potential crack formation and failure, leaving additional solid material in the rotor forging teeth that would otherwise be occupied by cooling channels allows longer operation of the rotor before repair or service retirement. Also depending upon a specific generator application, the portion of the rotor winding passing under the retaining ring can create a local hotspot that limits the current carrying capacity of the winding. By improving winding cooling with the cooling passages of the exemplary embodiments described herein the potential hotspot under the retaining ring is mitigated, allowing the rotor windings to carry higher current. Elimination of rotor teeth cooling passages also simplifies rotor blocking design under the retaining ring zone, as it is no longer necessary to provide unrestricted cooling/exhaust air flow paths to teeth cooling passages.

Exemplary embodiments described herein feature a thermo pump-cooled generator, comprising a stator defining a stator bore and a rotor mounted on a rotor shaft and circumscribed within the stator bore. The rotor has an outer circumference, axial ends and axially aligned rotor winding channels radially oriented about the rotor outer circumference, so that an annular air gap is defined between the stator bore and the rotor outer circumference. A retaining ring is coupled to an axial end of the rotor outboard the annular air gap. A plurality of rotor windings has axial portions that are respectively oriented within respective rotor winding channels, circumscribed by the stator bore and the air gap. The rotor winding also has end winding portions extending outboard the annular air gap, circumscribed by the retaining ring. A cooling passage is formed within the respective end winding portions. The end winding cooling passage extends axially inboard the retaining ring, in communication with the air gap, for exhausting air from the end winding portions that are circumscribed by the retaining ring into the air gap. The cooling passage has a cooling inlet on a radial underside of the respective rotor end winding facing the rotor shaft; and a cooling outlet on a radial upper side of the respective rotor winding axial portion that is oriented within the air gap.

Other exemplary embodiments described herein feature a method for thermo pump cooling a generator, comprising providing a generator having a stator defining a stator bore and a rotor mounted on a rotor shaft and circumscribed within the stator bore. The provided rotor has an outer circumference, axial ends and axially aligned rotor winding channels radially oriented about the rotor outer circumference. The provided generator has an annular air gap defined between the stator bore and the rotor outer circumference and a retaining ring coupled to an axial end of the rotor outboard the annular air gap. The provided rotor has a plurality of rotor windings having axial portions that are respectively oriented within respective rotor winding channels, circumscribed by the stator bore and the air gap, and having end winding portions extending outboard the annular air gap, circumscribed by the retaining ring. A cooling passage is formed within the provided respective end winding portions that extend axially inboard in communication with the air gap. The end winding portion cooling passage has a cooling inlet on a radial underside of the respective rotor end winding facing the rotor shaft, and a cooling outlet on a radial upper side of the respective rotor winding axial portion that is oriented within the air gap. This exemplary embodiment cooling method is practiced by driving the generator shaft, heating air confined within the circumscribing retaining ring that is in communication with the end winding portions. Heated air is exhausted from the end winding portions that are circumscribed by the retaining ring into the air gap by receiving the heated air in the cooling inlet and exhausting the heated air out of the cooling outlet into the air gap.

Additional embodiments described herein feature a rotor winding for a thermo pump-cooled generator of the type having a stator bore, a rotor mounted on a rotor shaft and circumscribed within the stator bore, the rotor having an outer circumference, axial ends and axially aligned rotor winding channels radially oriented about the rotor outer circumference, an annular air gap defined between the stator bore and the rotor outer circumference, and a retaining ring coupled to an axial end of the rotor outboard the annular air gap. The rotor winding embodiment has an axial portion adapted for insertion into a generator rotor channel, having a radially oriented upper side for orientation within a rotor/stator bore air gap; an end winding portion coupled to the axial portion, adapted for orientation within a circumscribing retaining ring, having a radial underside facing the rotor shaft; and a cooling passage formed within the rotor winding end winding portion and extending axially into the axial portion for communication with a rotor/stator air gap. The winding cooling passage exhausts air from the end winding portions that are circumscribed by the retaining ring into the air gap. The winding cooling passage has a cooling inlet on the radial underside of the end winding portion of the rotor winding facing the rotor shaft; and a cooling outlet on a radial upper side of the rotor winding axial portion that is adapted to be oriented within the air gap.

The respective features of the embodiments of the invention describe herein may be applied jointly or severally in any combination or sub-combination.

BRIEF DESCRIPTION OF THE DRAWINGS

The exemplary embodiments of the invention can be readily understood by considering the following detailed description in conjunction with the accompanying drawings, in which:

FIG. 5 is an axial cross sectional view of a rotor winding with cooling passages constructed in accordance with an exemplary embodiment of the invention, taken along 5-5 of FIG. 4;

FIG. 6 is a radial cross sectional view of the rotor winding of FIG. 5; and

FIG. 7 is a fragmented bottom plan view of a generator winding lamina of FIGS. 5 and 6.

To facilitate understanding, identical reference numerals have been used, where possible, to designate identical elements that are common to the figures.

DETAILED DESCRIPTION

Figure 1:
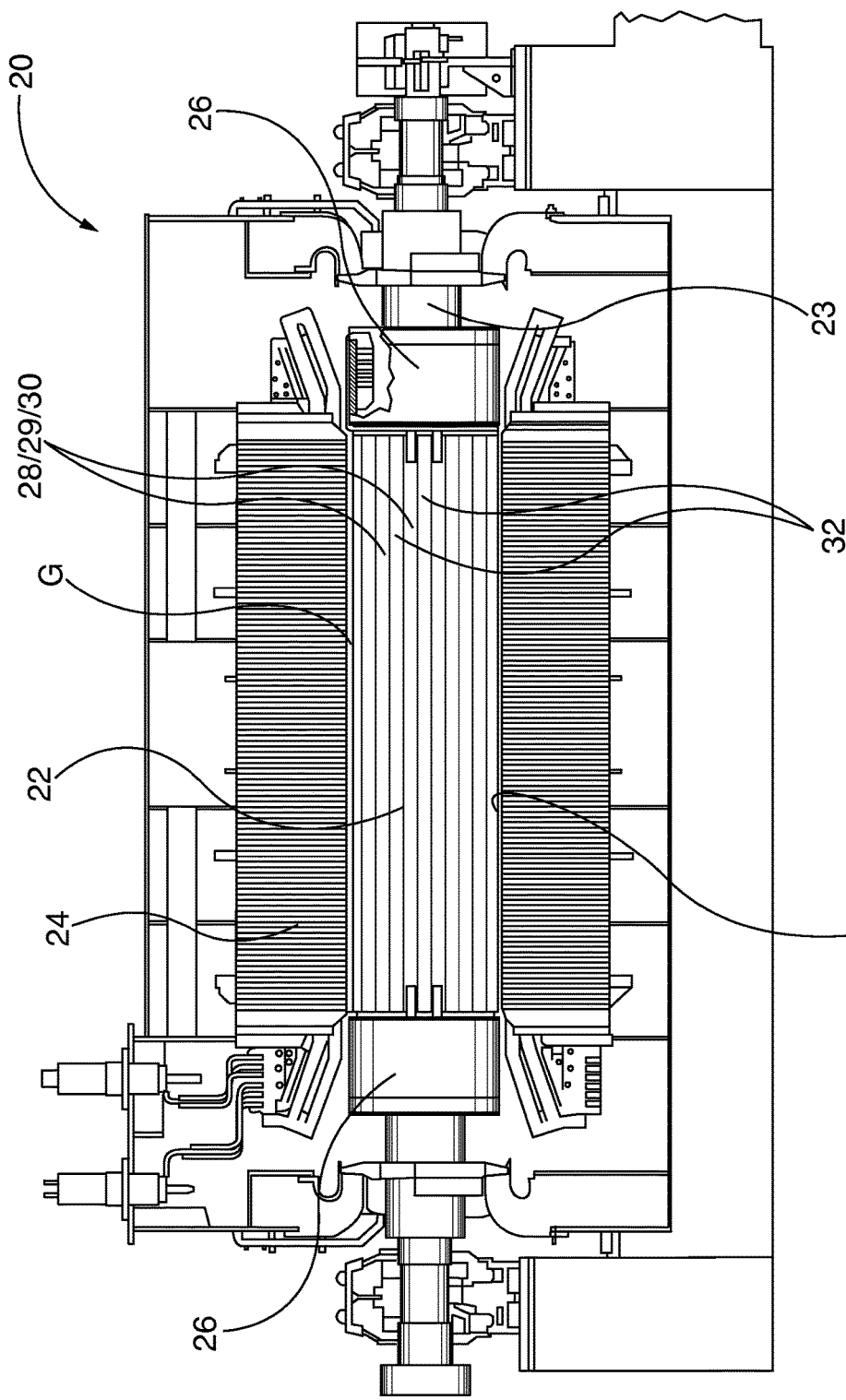
FIG. 1 is an axial cross-sectional view of a known thermo pump-cooled generator.
Figure 2:
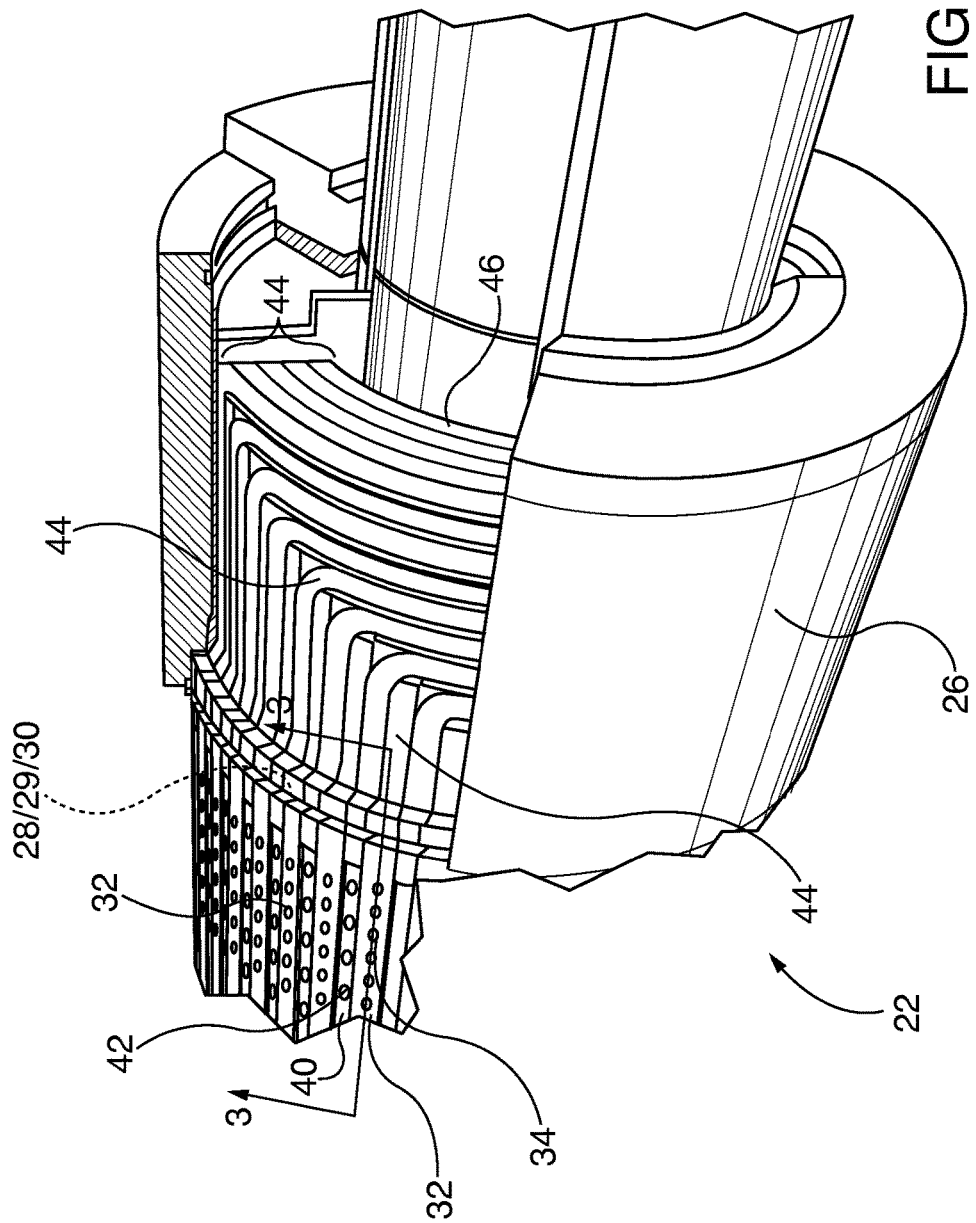
FIG. 2 is a perspective cut away view of the known generator rotor of the FIG. 1 known generator.
Figure 3:
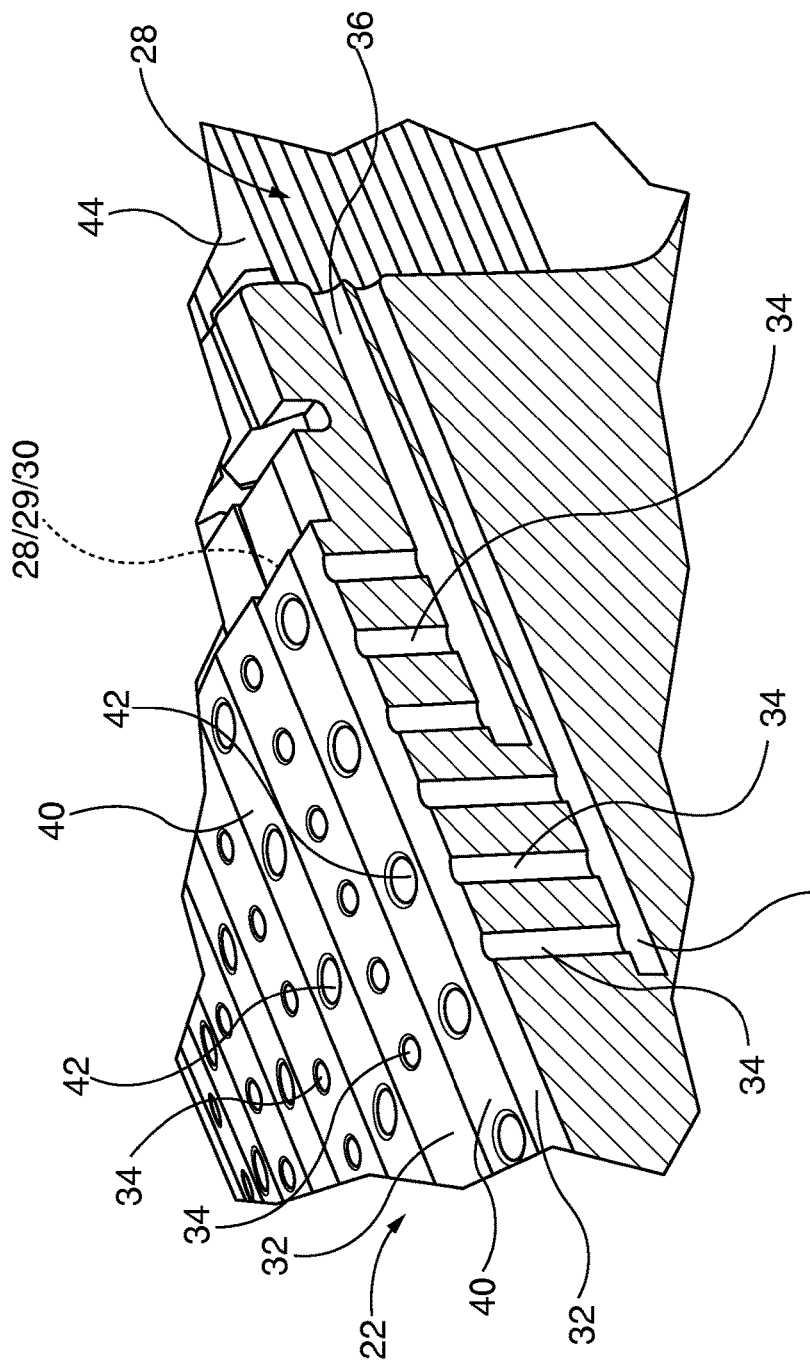
FIG. 3 is a detailed cross sectional perspective view of a known rotor tooth cooling passages of the known rotor, taken along 3-3 of FIG. 2.
Figure 4:
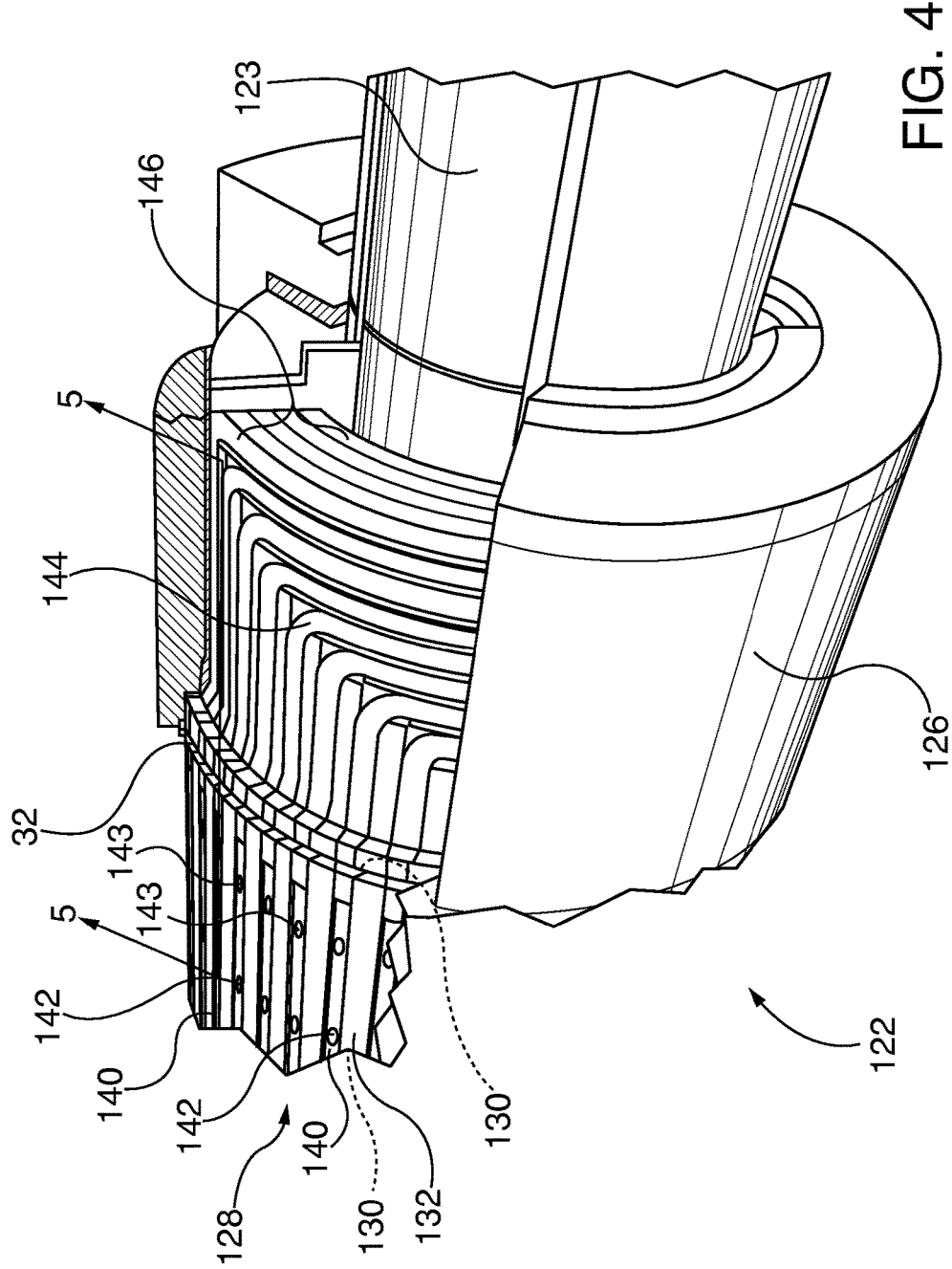
FIG. 4 is a perspective cut away view of an exemplary embodiment of a thermo pump-cooled generator rotor incorporating rotor windings that are constructed in accordance with an exemplary embodiment of the invention.

Embodiments described herein, also with reference to FIGS. 4-7, can be utilized in rotor windings for a thermo pump-cooled generator, which have an internally formed cooling passage. The winding cooling passage has a cooling inlet on a radial underside of the motor end winding portion and a cooling outlet on a radial upper side of the axial portion that is oriented within the generator air gap. The cooling passage in the rotor winding exhausts air from end winding portions that are circumscribed by a generator retaining ring into the generator air gap. In some embodiments the rotor winding cooling passages are substituted for known cooling air channels formed in rotor teeth. In other embodiments, the rotor winding cooling passages are used in conjunction with cooling channels formed in rotor teeth.

The rotor 122 of FIGS. 4-7 relies on thermo pump-cooling to extract heat from the region outboard the rotor axial end that is circumscribed by the retaining ring 126 into the rotor air gap that is inboard the retaining ring. Rotor windings 128 have axial portions 129 that are respectively oriented within respective rotor winding channels 130, circumscribed by the generator stator bore and the air gap. The rotor winding channels 130 are circumferentially separated by rotor teeth 132 that do not have vent channels.

The rotor windings 128 also have end winding portions 144, including end turn bend portions that extend outboard the annular air gap. The end winding portions 144 are circumscribed by the retaining ring 26. The retaining ring 126 supports the rotor winding end portions 144 end turns against centrifugal force generated by rotating rotor 22. A cooling passage is formed within the respective end winding portions 144. The end winding cooling passage extends axially inboard the retaining ring 126, in communication with the air gap, for exhausting air from the end winding portions that are circumscribed by the retaining ring into the air gap. The cooling passage has a cooling inlet 150 on a radial underside of the respective rotor end winding 144 facing the rotor shaft 123; and a cooling outlet 152 on a radial upper side of the respective rotor winding axial portion 129 that is oriented within the air gap, exhausting to the air gap via the vent 143 that is formed in the wedge 140 and in the filler 141.

In FIGS. 5-7 the rotor winding 128, including its axial portion 129 and end winding portion 144 comprises a plurality of radially stacked winding strap laminations 146A-146D. The lower most radially oriented strap 146A defines the intake of the cooling inlet 150, while the upper most radially oriented strap 146D defines the exhaust of the cooling outlet 152. The stacked straps respectively and collectively form the cooling inlet 150 and the cooling outlet 152. One or more of the lamina straps 146A-146D have channels 148 to facilitate axial directional passage of cooling/venting air flow $F_{IN}$-$F_{OUT}$ from the cooling inlet 150 to the cooling outlet 152. While four stacked winding strap laminations are shown in those figures, a different number of them may be utilized to form a rotor winding.

In some embodiments the winding strap axially directed channels 148 extend further inboard from the cooling outlet 152 and are in communication with other rotor air cooling radial cooling vents 162 that in turn vent radially into the annular gap G through vent holes 142 formed within wedge 140 and the filler block 141. The radial vents 162 are formed in the rotor 22 radially inwardly of the rotor winding cooling outlet 152 and its associated vent 143. The radial vents 162 are in communication with the axial vents 164 that are formed in the rotor 122 below the rotor winding axial portion 129.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A thermo pump-cooled generator, comprising:
   a stator defining a stator bore;
   a rotor mounted on a rotor shaft and circumscribed within the stator bore, the rotor having an outer circumference, axial ends and axially aligned rotor winding channels radially oriented about the rotor outer circumference;
   an annular air gap defined between the stator bore and the rotor outer circumference;
   a retaining ring coupled to an axial end of the rotor outboard the annular air gap;
   a plurality of rotor windings having axial portions that are respectively oriented within respective rotor winding channels, circumscribed by the stator bore and the air gap, and having end winding portions extending outboard the annular air gap, circumscribed by the retaining ring, the respective end winding portions comprising, with respect to the rotor shaft, an axial part and a circumferential part;
   a cooling passage formed within the respective end winding portions, the cooling passage comprising a plurality of radially stacked winding straps under the retaining ring and extending axially inboard in communication with the air gap, the cooling passage having:
   a cooling inlet on the lower most radially oriented winding strap located on an underside of the respective winding strap facing the rotor shaft, wherein air enters into the cooling passage from the cooling inlet on the lower most radially oriented winding strap and travels axially along the plurality of winding straps under the retaining ring;
   a cooling outlet on the upper most radially oriented winding strap located on an upper side of the respective winding strap axial portion that is oriented within the air gap, wherein the air exits the cooling passage into the air gap from the cooling outlet on the upper most radially oriented winding strap,
   an axial vent formed in the rotor; and
   a radial vent formed in the rotor,
   wherein at least one winding strap having a channel formed therein that defines the cooling passage,
   wherein the cooling inlet and the cooling outlet are formed and arranged to ensure thermo pump cooling flow,
   wherein the cooling passage extends further inboard from the cooling outlet and is in communication with the radial air vent, and
   wherein the radial air vent is in communication with the axial vent.

2. The generator of claim 1, wherein the cooling passage is contained within the axial part of the end winding portion and the axial portion of the rotor winding.

3. A method for thermo pump cooling a generator, comprising:

providing a generator having:

a stator defining a stator bore;

a rotor mounted on a rotor shaft and circumscribed within the stator bore, the rotor having an outer circumference, axial ends and axially aligned rotor winding channels radially oriented about the rotor outer circumference;

an annular air gap defined between the stator bore and the rotor outer circumference;

a retaining ring coupled to an axial end of the rotor outboard the annular air gap;

a plurality of rotor windings having axial portions that are respectively oriented within respective rotor winding channels, circumscribed by the stator bore and the air gap, and having end winding portions extending outboard the annular air gap, circumscribed by the retaining ring, the respective end winding portions comprising, with respect to the rotor shaft, an axial part and a circumferential part;

a cooling passage formed within the respective end winding portions, the cooling passage comprising a plurality of radially stacked winding straps under the retaining ring and extending axially inboard in communication with the air gap, having a cooling inlet on the lower most radially oriented winding strap located on an underside of the respective winding strap facing the rotor shaft, and a cooling outlet on the upper most radially oriented winding strap located on an upper side of the respective winding strap axial portion that is oriented within the air gap;

driving the generator shaft, heating air confined within the circumscribing retaining ring that is in communication with the end winding portions; and exhausting heated air from the end winding portions that are circumscribed by the retaining ring into the air gap by receiving the heated air into the cooling passage from the cooling inlet on the lower most radially oriented winding strap and traveling axially under the retaining ring along the plurality of winding straps and exhausting the heated air out of the cooling passage from the cooling outlet on the upper most radially oriented winding strap into the air gap, an axial vent formed in the rotor; and a radial vent formed in the rotor, wherein at least one winding strap having a channel formed therein that defines the cooling passage, wherein the cooling inlet and the cooling outlet are formed and arranged to ensure thermo pump cooling flow, wherein the cooling passage extends further inboard from the cooling outlet and is in communication with the radial air vent, and wherein the radial air vent is in communication with the axial vent.

4. The method of claim 3, wherein the cooling passage is contained within the axial part of the end winding portion and the axial portion of the rotor winding.

* * * * *